United States Patent Office 3,392,201
Patented July 9, 1968

3,392,201
PROCESS FOR MAKING ALKYL TRISULFIDES
Paul F. Warner, Phillips, Tex., assignor to Phillips Petroleum Company, a corporation of Delaware
No Drawing. Filed Aug. 25, 1965, Ser. No. 482,595
3 Claims. (Cl. 260—608)

ABSTRACT OF THE DISCLOSURE

Alkyl trisulfides are formed by reacting a thiol with sulfur in the presence of at least one of an alkali metal hydroxide and ammonium hydroxide and in the presence of a minor amount of dimethyl aminomethyl phenol.

---

This invention relates to a method for making organic trisulfides.

When making organic sulfide materials mixtures of various organic sulfides, mercaptans, and similar sulfur-containing compounds are formed which mixtures not only do not contain sufficiently large amounts of the desired high purity organic sulfides but also are quite corrosive.

It has now been found that high yields of high purity, non-corrosive organic trisulfide materials can be formed by treating a material which contains organic trisulfides and organic polysulfides containing more than three sulfur atoms per molecule with at least one alkali metal hydroxide or ammonium hydroxide.

Accordingly, it is an object of this invention to provide a new and improved method for making organic trisulfides.

Other aspects, objects and the several advantages of this invention will be readily apparent to those skilled in the art from the description and the appended claims.

According to this invention a material containing organic polysulfides having more than three, preferably 4 to 6, sulfur atoms per molecule is formed and is treated, either during the formation of the material or after the formatino of the material or both, with at least one material selected from the group consisting of alkali metal hydroxides and ammonium hydroxide in amounts, at a temperature, and for a time effective to convert substantial amounts of the polysulfides to the corresponding trisulfides.

The organic trisulfide and polysulfide containing materials can be formed in any conventional manner known to those skilled in the art such as by reacting a mercaptan with sulfur in the presence of an alkali catalyst such as alkali metal sulfides, ammonia, amines such as alkyl amines or aryl amines (aniline) or combinations thereof and the like. A full and complete disclosure of a method for forming these materials can be found in U.S. Patent 3,022,351.

Although the organic trisulfides and organic polysulfides can vary widely as to their contained organic radical, the radicals are generally either an alkyl radical or a cycloalkyl radical or both, preferably an alkyl radical, wherein the alkyl radical contains from 1 to 16 carbon atoms per molecule, inclusive. and the cycloalkyl radical contains from 4 to 16 carbon atoms per molecule, inclusive. The organic trisulfides and organic polysulfides according to this invention have the formula RSSSR and $RS_nR$ wherein the R is an organic radical as discussed above and $n$ varies as a whole integer from 4 up, preferably 4–6. The organic radicals in any given tri- or polysulfide are preferably the same can differ, e.g. one R of a given sulfide can be an alkyl radical while the other R can be a cycloalkyl radical.

Generally, the material will contain at least a major amount, i.e. at least 50 weight percent based on the total weight of the material, of the organic trisulfide and organic polysulfides. The amount of organic polysulfide present in the sulfide material to be treated can vary from 1 to 100 weight percent of organic polysulfides based on the total weight of the material to be treated, the remainder being substantially all di- and trisulfides and minor amounts of sulfur containing materials such as mercaptans.

The sulfide-containing material can be treated with any one or a mixture of alkali metal hydroxides of all the alkali metals, preferably sodium, potassium, lithium, and rubidium. Also, mixtures of these compounds with ammonium hydroxide can be employed. Of course, ammonium hydroxide can be used per se.

The amount of alkali metal hydroxide and/or ammonium hydroxide added to the sulfide-containing materials can vary widely depending upon the sulfide containing material, process conditions and the like and need be that which is effective to cause conversion of the polysulfides to trisulfides under the given process conditions. Generally, from about 10 to about 60, preferably from about 15 to about 45, weight percent of the alkali metal hydroxide can be employed based on the total weight of the sulfide containing materials treated.

The alkali metal hydroxide is preferably employed in solution in a solvent which can be either organic or inorganic as long as it is substantially non-deleterious to the tri- and polysulfides present in the material treated.

The preferred solvents include water and alcohols such as alkanol or aliphatic alcohols. Such alcohols preferably contain from 1 to 12 carbon atoms per molecule, inclusive, and include methanol, ethanol, propanol, 2-propanol, 1-pentanol, 2-pentanol, 3-pentanol, 1,1-dimethyl-propanol, heptanol, decanol, 3-decanol, dodecanol and 1,1-dimethyloctanol, and the like. Although it can vary widely, the amount of alkali metal hydroxide employed in a solution can be about ½ mol per mol of solvent although more or less alkali metal hydroxide can be employed per mol of solvent depending upon the solubility of the hydroxide in the solvent and the like.

If desired, a sulfur acceptor can be employed in the sulfide containing material to be treated to take up sulfur freed from the polysulfides in order to make the trisulfide. A preferred acceptor is a thiol having alkyl or cycloalkyl radicals of the same carbon atom scope as the radicals for the tri- and polysulfides discussed hereinabove. These thiols preferably have the formula RSH where R is an alkyl or cycloalkyl radical. In general, the amount of thiol employed will be at least 2, preferably about 2, moles of thiol per mole of sulfur to be removed from the polysulfide. For example, if a pentasulfide is treated 4 moles of thiol are used to form the corresponding trisulfide.

The temperature at which the alkali metal hydroxide and/or ammonium hydroxide is reacted with the sulfide-containing material and the time duration of such reaction can both vary widely for reasons such as those set forth above with respect to the amount of alkali metal hydroxide and/or ammonium hydroxide employed, but generally will be that sufficient to obtain conversion of substantial amounts of the polysulfides to the corresponding trisulfide thereby converting the sulfide-containing material to a material containing the trisulfide and only minor amounts of corrosive materials. Generally the temperature of the reaction will vary from about 80 to about 400, preferably from about 150 to about 180, ° F. although the time for reaction will be at least ½ hour it is preferably from about ½ to about 3 hours. The pressure can also vary widely but will generally be from about ambient to about 150 p.s.i.g.

Generally, the resulting sulfide-containing material after treatment with the alkali metal hydroxide will contain at least 75 weight percent of the organic trisulfide based upon the total weight of that product.

Although the product of this invention is relatively pure it can be further purified as desired to render it even more non-corrosive by adding to the product a mixture of alkali metal hydroxide, alkanols, and mercaptans equivalent to the polysulfide weight content of the product, heating the resulting mixture, and removing unreacted mercaptans.

EXAMPLE I

To a one-liter mixing flask equipped with a heating mantle and mechanical stirrer, the following charge was made:

TABLE I

|  | Grams | Mols |
|---|---|---|
| 2-methyl-2-propane thiol | 180 | 2 |
| Sulfur (flowers) | 64 | 2 |
| Dimethyl aminomethyl phenol | 2 |  |

The thiol and phenol were charged first after which the sulfur was added in small increments while warming the flask to keep the reaction going. After about 30 minutes substantially all the sulfur had been added and the mixture was heated to a temperature of from 160 to 180° F. for about 1 hour at about 15 p.s.i.g. A sample (1) of about 10 milligrams was withdrawn for analysis by gas chromatography. Thereafter about 88 grams (2.2 mols) of sodium hydroxide and about 88 grams (4.9 mols) of water were added to the remainder of the mixture and this mixture was heated at from 200 to 220° F. with agitation for about 4 hours after which a sample (2) of about 10 milligrams was withdrawn for analysis by gas chromatography. The composition of the samples were as follows:

TABLE II

| Sample | Weight Percent Based on Total Weight of Sample | |
|---|---|---|
|  | 1 | 2 |
| 2-methyl-2-propane thiol | 2.3 | 0.1 |
| Di-tert-butyl disulfide | .4 | 18.2 |
| Di-tert-butyl trisulfide | 52.4 | 79.8 |
| Di-tert-butyl polysulfides | 44.2 | 0.2 |
| Other | Remainder | |

It can be seen from this example that substantially all of the polysulfides were converted to the trisulfides or lower sulfides.

It can be seen that sample (2) which was treated in accordance with this invention contained a much larger amount of organic trisulfide, was a more pure organic trisulfide product, and was relatively non-corrosive due to its low thiol content. As will be shown in Example II the amount of disulfide formed can be minimized by control of process conditions.

EXAMPLE II

To a one-quart, stirred autoclave was charged 4 mols of 2-methyl-2-propane thiol, 4 mols of sulfur, and 2 mols each of sodium hydroxide and methanol. The autoclave was then gradually heated over a period of from 20 to 30 minutes to a temperature of 175° F. at about 15 p.s.i.g. after which it was maintained at this temperature for about 3.3 hours. During this heating operation about 10 milligram samples were taken for analysis by gas chromatography. Sample 1 was taken from the autoclave as soon as the mixture reached 175° F. so that substantially no heating of the contents of the autoclave occurred except during the warm-up period of from 20 to 30 minutes. Samples 2, 3, and 4 were removed from the autoclave after 1, 2, and 3.3 hours of reaction time, respectively. The composition of the samples taken out were as follows:

TABLE III

| Compostion of sample, weight percent based on total weight of sample | Sample | | | |
|---|---|---|---|---|
|  | 1 | 2 | 3 | 4 |
| Materials lighter than di-ter-butyl disulfide | 7.9 | 8.4 | 4.9 | 6.7 |
| Di-tert-butyl disulfide | 0.8 | 0.8 | 2.4 | 3.5 |
| Di-tert-butyl trisulfide | 84.7 | 87.3 | 87.3 | 85 |
| Materials heavier than di-tert-butyl disulfide | 5.1 | 2.3 | 2.9 | 2.3 |
| Other | Remainder | | | |

It can be seen from this example that large amounts of trisulfide were formed while the amount of disulfide formed was held to a minimum and that some sacrifice of trisulfide content was realized by heating for 3.3 hours.

EXAMPLE III

To a one-quart, stirred autoclave was charged 4 mols of 2-methyl-2-propane thiol, 4.4 mols of sulfur, 2.2 mols of sodium hydroxide, and 2.5 mols of methanol. The autoclave was then heated at about 180° F. and about 21 p.s.i.g. for about 2.3 hours. After this heating operation about 10 milligrams of a sample was taken for analysis by gas chromatography. The composition of the sample was as follows:

TABLE IV

Composition of sample, weight percent
based on total weight of sample: Sample
    Materials lighter than di-tert butyl disulfide ___ 9.2
    Di-tert-butyl disulfide _____ 2.7
    Di-tert-butyl trisulfide _____ 84.7
    Materials heavier than di-tert-butyl disulfide __ 2.6
    Other _____ Remainder The above sample was further treated with an aqueous solution of sodium plumbite in the presence of air in order to render same more non-corrosive.

This further treated sample had the following composition:

TABLE V

Composition of sample, weight percent
based on total weight of sample: Sample
    Materials lighter than di-tert-butyl disulfide ___ 1.2
    Di-tert-butyl disulfide _____ 3.1
    Di-tert-butyl trisulfide _____ 93.6
    Materials heavier than di-tert-butyl disulfide __ 1.2
    Other _____ Remainder This further treated sample was quite non-corrosive as is indicated by its having an ASTM copper strip classification of 2 (moderate tarnish) b (color). The method by which this ASTM copper strip classification was obtained was that set forth in the ASTM copper strip corrosion test D–130–56 modified by diluting the sample with an odorless mineral spirit identified as "Soltrol 170" to a final sample containing 10 weight percent of the trisulfide based upon the total weight of the final sample, the remainder being substantially all mineral spirits. The "Soltrol 170" has a distillation range initial boiling point of 420° F. minimum and an end point of 450° F. minimum to 475° F. maximum, with a specific gravity of liquid at 60/60° F. of 0.770 minimum to 0.780 maximum (ASTM D–1298), neutral acidity (ASTM D–1093), and copper corrosion value after 3 hours at 212° F. of 1–$b$ (ASTM D–130). The ASTM D–130–56 test was further modified in that the test was carried out a temperature of about 250° F. instead of the specified 212° F.

Thus, it can be seen that not only is a relatively non-corrosive product formed by this invention but that product can be made even more non-corrosive by conventional methods.

Reasonable variations and modifications are possible within the scope of this disclosure without departing from the spirit and scope thereof.

I claim:
1. In a method for forming an organic trisulfide of the formula RSSSR where R is an alkyl radical having from 1 to 16 carbon atoms per molecule, inclusive, wherein a thiol of the formula RSH where R is defined as above is reacted with sulfur in the presence of at least one of an alkali metal hydroxide an ammonium hydroxide to form a reaction mixture containing compounds of the formulae RSSR, RSSSR, and $R(S)_nR$ wherein $n$ is a whole integer from 4 up and where R is defined as above, the improvement comprising employing a minor amount of dimethyl aminomethyl phenol so that the final reaction mixture contains at least 75 weight percent based upon the total weight of said recation mixture of at least one compound of the formula RSSSR where R is defined as above.

2. The method according to claim 1 wherein R is a butyl radical, and both alkali metal hydroxides mentioned in claim 1 are sodium hydroxides.

3. The method according to claim 2 wherein said butyl radical is a tert-butyl radical.

References Cited

UNITED STATES PATENTS

| | | |
|---|---|---|
| 3,022,351 | 2/1962 | Mihm et al. _____ 260—608 |
| 3,275,693 | 9/1966 | Bapseres et al. _____ 260—608 |

FOREIGN PATENTS

| | | |
|---|---|---|
| 1,336,087 | 7/1963 | France. |

OTHER REFERENCES

Holmberg: Ann. der Chem. 359, 81–84 (1908).
Reid: Chemistry of Bivalent Sulfur, vol. 3, p. 391.

CHARLES B. PARKER, *Primary Examiner.*
JOSEPH BRUST, *Examiner.*
DELBERT ROSS PHILLIPS, *Assistant Examiner.*